UNITED STATES PATENT OFFICE.

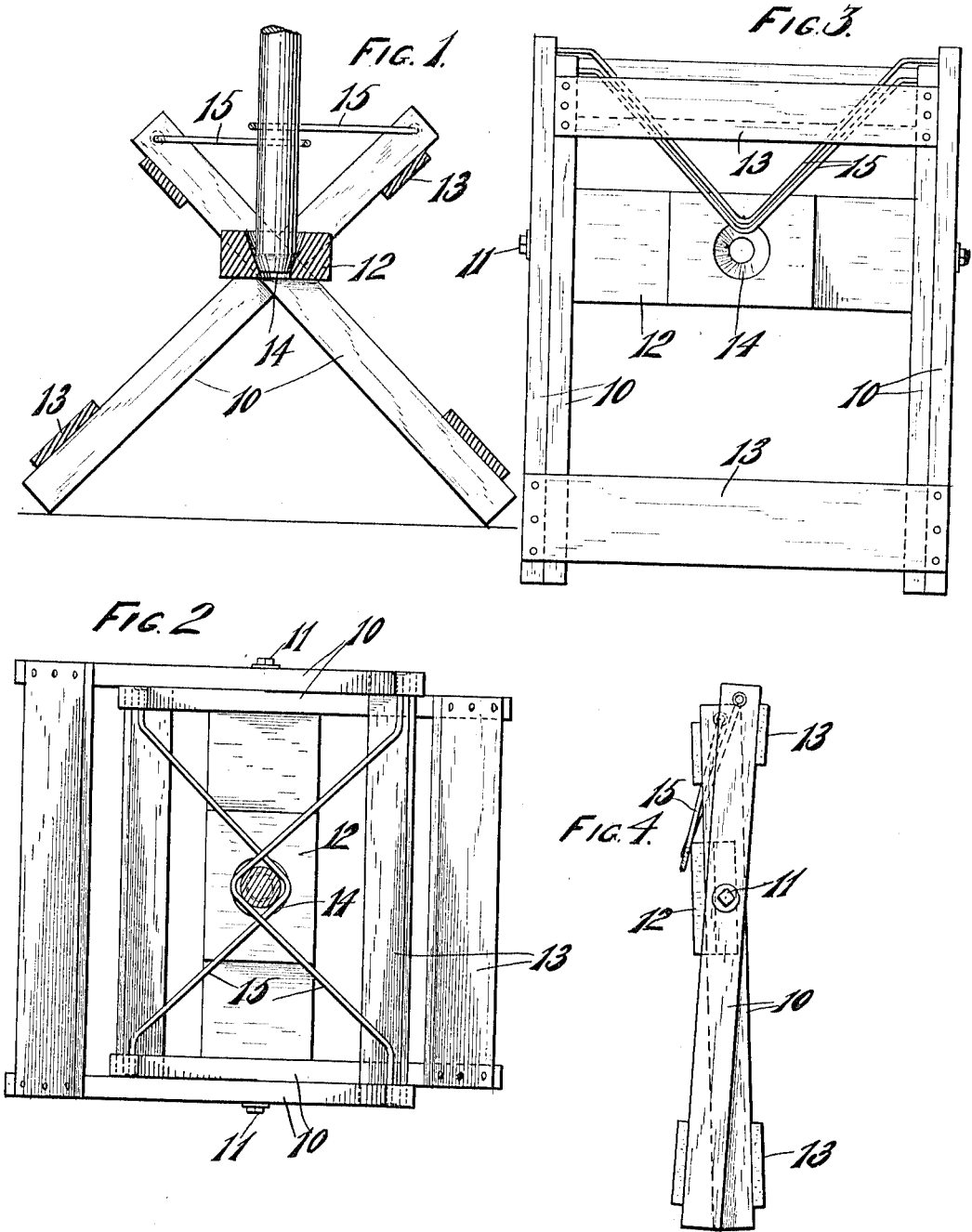

HUGO TRILLING, OF SHEBOYGAN, WISCONSIN.

CHRISTMAS-TREE HOLDER.

1,040,593.  Specification of Letters Patent.  Patented Oct. 8, 1912.

Application filed October 2, 1911. Serial No. 652,384.

*To all whom it may concern:*

Be it known that I, HUGO TRILLING, a citizen of the United States, and resident of Sheboygan, in the county of Sheboygan and State of Wisconsin, have invented new and useful Improvements in Christmas-Tree Holders, of which the following is a description, reference being had to the accompanying drawings, which are a part of this specification.

This invention has for its object to provide a simple and efficient means for supporting a Christmas tree or the like which will be adapted for use with trees of various sizes.

An object of the invention is to provide a Christmas tree holder which will automatically clamp the tree in place thereon, the clamping action depending upon the weight of the tree.

Another object of the invention is to provide a Christmas tree holder which will be inexpensive to construct and which may be readily attached and detached from the tree.

With the above and other objects in view the invention consists in the Christmas tree holder herein claimed and all equivalents.

Referring to the accompanying drawings in which like characters of reference indicate the same parts in the different views: Figure 1 is a sectional elevation of a Christmas tree holder constructed in accordance with this invention; Fig. 2 is a plan view thereof; Fig. 3 is a side view of the Christmas tree holder collapsed for shipping or storing; and, Fig. 4 is an edge view thereof.

In these drawings 10 indicates two pairs of cross arms, the arms of each pair being pivoted together on a bolt or connecting screw 11, preferably a lag screw which is turned into the end of a centerpiece 12. Cross pieces 13 connect the top and bottom ends of the arms 10 to form a pair of rectangular frames and these frames may swing upon the pivotal screws 11 to assume the extended set up position shown in Fig. 1 or the closed collapsed position shown in Fig. 4. The centerpiece 12 is provided with a central tapering opening or socket 14 to receive the end of the stem of the Christmas tree and V-shaped wire loops have their ends pivotally mounted in the ends of the arms, one for each frame, and are of such size that when the holder is set up, they overlap each other as shown in Fig. 2 to form a square clamping band through which the stem of the tree is passed before being seated in the tapering opening of the centerpiece.

In use the holder firmly clamps the stem of the tree between the wire loops 15 which coöperate with the centrepiece in holding the tree rigidly in its upright position. The weight of the tree, which is borne by the centerpiece, serves to give the frame ends a tendency to move farther apart and this tightens the clamping action of the loops on the tree, so that the weight of the tree itself serves to operate the clamping means by which it is supported. There is no necessity for making the Christmas tree holders of sizes to fit Christmas tree stems of different diameters and there is no necessity for shaping the end of the Christmas tree stem to fit the holder, for the tapering opening of the centerpiece is capable of receiving and centering the stems of Christmas trees of various sizes and the opening between the wire frames 15 may be made larger or smaller to accommodate trees of various sizes by the swinging movement of the frames.

For shipping or for storing the Christmas tree holder may be collapsed to occupy very small space, as shown in Fig. 4, and being of such a simple construction it is durable and inexpensive to manufacture.

Obviously the invention is not confined to its use as a Christmas tree holder, but is applicable for various other purposes, such as holding a flag staff or the like.

What I claim as new and desire to secure by Letters Patent is:

1. A Christmas tree holder or the like, comprising a pair of frames with their side members crossing each other and pivoted together, a centerpiece extending between the pivotal connections and provided with a socket to receive the stem of a tree, and overlapping loops secured to the upper ends of the respective frames for engaging the stem of the tree.

2. A collapsible Christmas tree holder, comprising a pair of rectangular frames with the side members thereof crossing each other, pivot screws passing through the intersection of the side members of the frames for permitting them to swing with relation to each other, a centerpiece having its ends engaged by the screws and provided with a central tapering opening to receive the stem of a tree, and a pair of V-shaped wire loops pivotally connected to the upper ends of the respective frames and adapted to overlap each other to form a clamping band for surrounding the stem of the tree.

In testimony whereof, I affix my signature, in presence of two witnesses.

HUGO TRILLING.

Witnesses:
JOSEPH DANWATOWSKI,
GUIDA TRILLING.